Patented Dec. 26, 1950

2,535,876

UNITED STATES PATENT OFFICE 2,535,876

BETA-(HETEROCYCLIC-THIO) PROPIONIC ACID AND DERIVATIVES AS PLANT STIMULANTS

William D. Stewart, Yonkers, N. Y., assignor to The B. F. Goodrich Company, New York, N. Y., a corporation of New York No Drawing. Application September 3, 1947, Serial No. 772,004

18 Claims. (Cl. 71—2.5)

This invention relates to synthetic compositions which produce histogenic and morphogenic changes in living plants, and more specifically pertains to derivatives of propionic acid which are capable of altering the growth characteristics of plants.

The art of controlled modification of plant growth by the application of synthetic growth regulants has aroused considerable interest in recent years. Many materials have been discovered which when applied to plant structure in minute amounts act as growth regulants. For example, chemical compounds have been found which stimulate and initiate root growth, which stimulate the growth of the abscission cells of fruit stems, which at increased dosages retard the growth of the abscission cells of fruit stems, which stimulate stem bud growth, which stimulate seed germination, which promote callus formation, and which function in similar ways as evocators of plant histogenesis and morphogenesis.

Among the known synthetic plant growth regulants are, for example, indoleacetic acid, indolebutyric acid, indolepyruvic acid, naphthalene acetic acid, naphthalene butyric acid, phenyl acetic acid, 2,4-dichlorophenoxy acetic acid, naphthalene glycolic acid and others. While these materials have been widely used, they have not been completely satisfactory and hence there is a great need in the art of plant propagation for improved growth regulants. The known regulants and growth initiators are less effective than is desired in various aspects of plant propagation, for example, in the rooting of fruit tree cuttings to propagate desirable somatic characteristics of plants which cannot be transferred by the use of seed, in increasing the percentage of rooted cuttings of those plants now normally produced from cuttings instead of seed, in reducing the number of set fruit on heavy bearing fruit trees to reduce cost of thinning, in producing higher setting of fruit on light setting trees and bushes, in preventing the premature fall of fruit, in producing seedless or near seedless fruits by inducing parthenogenesis.

Moreover, few of the known plant growth regulants can be synthesized on factory production scale so as to be either available in large enough quantities to supply the demand or sufficiently low in price to attract the attention of prospective users. Also, those which are available in sufficient quantity and at a marketable price to make their use economically feasible do not have as wide a range of tolerance of application as is desirable, for the difference between the effective concentration and that which causes undesirable injury to the plant is relatively small in many instances. Consequently, the use of many of the regulants that are now available not only requires the attention of a highly skilled technically trained supervisor during application of the materials but also requires the precise measuring of small quantities in the field with precision usually available only in the chemical laboratory. Accordingly, the precision and supervision required to employ successfully the available regulants and to achieve the maximum benefits of their use often prevent large scale field application by the average prospective user.

I have discovered a class of growth regulants which are exceedingly successful in the art of plant propagation for altering the growth characteristics of plants and which are capable of being successfully applied by a person possessing no special skill. These new materials are beta-(heterocyclic-thio) propionic acids and derivatives thereof which can be converted to the free acid through hydrolysis such as esters, amides and salts. These materials function as evocators of histogenesis and morphogenesis in diverse manners to alter the growth characteristics of many types of plants.

The preferred compounds of this new class of growth regulants are those beta-(heterocyclic-thio) propionic acids and their derivatives which have the following general formula:

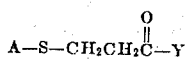

where A is a nitrogen containing heterocyclic radical having its connecting valence on a ring carbon atom, preferably a ring carbon atom directly adjacent to a ring nitrogen atom, and more preferably one which is directly intermediate a ring nitrogen and a ring sulfur or oxygen atom. The radical A will ordinarily be made up of a plurality of carbon and hydrogen atoms, a single nitrogen atom and in preferred instances also a single sulfur or oxygen atom and will preferably contain in addition to the hetero atoms of the heterocyclic ring only hydrogen and carbon atoms. Y in the formula is a member of the group of chemical substituents consisting of the hydroxyl radical (in which event the compound is an acid); an oxy hydrocarbon radical (in which event the compound is an ester); the amido radical or a hydrocarbon substituted amido radical (in which events the compound is an amide); and an oxy ammonium or oxy metallic group (in which events the compound is a salt). These propionic acid derivatives where Y is not OH are all capable of being converted to the free acid through hydrolysis involving one molecule of water.

The beta-(heterocyclic-thio) propionic acids and their derivatives having the formula set forth above can be readily and economically prepared by several methods. For example, beta-chloro or beta-bromo propionic acids may be reacted with an alkali metal salt of a heterocyclic mercaptan such as a mercapto-thiazole or a mercapto-thiazoline to form the beta-(heterocyclic-thio) propionic acid and a metal chloride or bromide. The acids may also be prepared by reacting acrylonitrile with a heterocyclic mercaptan such as a mercapto thiazole and then converting the resulting nitrile to the acid. Another most convenient and economical method of preparation is to react beta-propiolactone with a mercapto thiazole or a thiazoline or the like. A more detailed discussion of the latter method of preparing these compounds is presented in a copending application of Thomas L. Gresham and Jacob Eden Jansen Serial No. 620,662, filed October 5, 1945, Patent No. 2,483,416 issued October 4, 1949. The hydrolyzable derivatives of the acids may be prepared from the free acids by methods well known to the art.

The beta-(heterocyclic-thio) propionic acids which are useful according to my invention include such compounds as, for example, the beta-(thiazyl-thio) propionic acids, the beta-(thiazolinyl-thio) propionic acids, the beta-(oxazylthio) propionic acids, the beta-(imidazol-thio) propionic acids, the beta-(imidazolinyl-thio) propionic acids, the beta-(thiodiazyl-thio) propionic acids, the beta-(thiazinyl-thio) propionic acids, the beta-(quinolyl-thio) propionic acids, the beta-(pyridyl-thio) propionic acids, and the beta-(pyrimidyl-thio) propionic acids, wherein the heterocyclic radicals are unsubstituted or contain only hydrocarbon substituents. As examples of a few specific compounds of this new class of growth regulants, the following can be readily obtained at a low cost: beta-(2-thiothiazolinyl) propionic acid, beta-(2-thio-5-methyl-thiazolinyl) propionic acid, beta-(2-thio-4-ethyl-thiazolinyl) propionic acid, beta-(2-thio-4,5-dimethyl-thiazolinyl) propionic acid, beta-(2-thio-4,5-tetra-methylene thiazolinyl) propionic acid, beta-(2-thio-4-phenyl-thiazolinyl) propionic acid, beta-(2-thio-4-ethyl-thiazyl) propionic acid, beta-(2-thio-4,5-diethyl-thiazyl) propionic acid, beta-(2-thio-thiazyl) propionic acid, beta-(2-thio-4-phenyl-thiazyl) propionic acid, beta-(2-thio-benzothiazyl) propionic acid, and beta-(2-thio-4,6,6-trimethyl thiazinyl) propionic acid.

The esters of the above beta-(heterocyclic-thio) propionic acids which are useful are such alkyl esters as the methyl, ethyl, n-propyl, isopropyl, n-butyl, isobutyl, tertiary-butyl, amyl, hexyl esters and the like; such aryl esters as the phenyl, naphthyl, tolyl esters and the like; such aralkyl esters as the benzyl phenethyl esters, and the like; such alicyclic esters as the cyclohexyl esters; such unsaturated aliphatic esters as the allyl, methallyl, 3-methyl-3-hexenyl, 2-methyl-1-butenyl esters, and the like, as well as others.

Also, other derivatives of the above acids are useful growth regulants. The amides and such substituted amides as, for example, the mono- and di-methyl amides, mono- and di-ethyl amides, mono- and di-isobutyl amides, mono- and di-cyclohexyl amides, mono- and di-phenyl amides, benzyl amides, and phenethyl amides have useful properties. The ammonium and metallic salts of the above acids also are useful, especially the sodium, potassium, magnesium, zinc, and iron salts.

The compounds of this invention may be employed in numerous ways to stimulate or modify the growth characteristics of plant structures. For example, they may be applied to seeds to stimulate germination or to stimulate root and stem development; they may be applied to tubers to promote root development and stem bud growth; they may be applied to cuttings and transplants to stimulate root formation, or they may be applied to blossoms to induce parthenogenesis. Also, they may be applied to intact plants to retard blossoming, to stimulate the growth of abscission cells to produce premature dropping of blossoms and set fruit, or by varying the manner of treatment may also modify the growth of abscission cells to prevent drop of mature fruit. Thus, these compounds may be capable of producing a variety of desirous modifications of plant growth which are exceedingly useful and beneficial to the operators of greenhouses, orchards and nurseries.

In the application of these compounds to produce these growth modifications different compositions may be employed. In general, aqueous dispersions or aqueous solutions depending on whether or not the compound is water-soluble will be found most desirable. The dispersions will, of course, contain a dispersion or wetting agent and the solutions also preferably contain wetting agents to facilitate the spreading of the solution. Such wetting and dispersing agents as, for example, those typified by the following general classifications: sodium and potassium salts of fatty acids known as soft and hard soaps; salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfonated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurates, palmitate, stearate, and oleate; and others may be advantageously employed in aqueous compositions employing this new class of growth regulants. These dispersing and wetting agents are sold under numerous trade names and may either be pure compounds or be mixtures of compounds of the same general group. The aqueous dispersions and solutions may also contain adhesives or stickers to prevent the removal of the stimuli by weathering. A material which will function as an excellent sticker or adhesive and may be employed with unusual success is the aqueous dispersions of polymeric organic polysulfides which on drying form a discontinuous, translucent, rubbery microscopic film. An example of this type of sticker is the aqueous dispersions of polymeric ethylene polysulfide prepared in the presence of a salt-stable emulsifying agent.

The compounds may also be applied in admixture with other diluents either as pastes or dusts. The pastes may be prepared with any inert vehicle while the dusts are usually prepared with some finely-divided inert material such as talc, flour, fuller's earth, clay or other pulverulent materials, soluble or insoluble in water.

In all their various applications, these plant growth modifying or stimulating compositions are applied to plant structures which are capable of growth, i. e., plant structures containing living cells and such plant structures containing dormant cells as tubers and seeds. In the application of these growth regulants to tubers and seeds, it is not known whether the action of the material is to modify the tuber or seed or to alter the growth characteristics of the plant which results from the tuber or seed. For the purposes of this invention, it is intended that the use of the term "plant" includes the living as well as dormant plants.

The following examples illustrate the ability of these compositions to stimulate the growth of various plant structures and further illustrates the numerous compositions in which these compounds can be successfully employed. In many of the examples, the results obtained from the use of indolebutyric acid, a growth promoting material which has enjoyed considerable commercial success, are given merely for purposes of comparison.

EXAMPLE I

In an assay to determine the growth promoting activity of members of the beta-(heterocyclic-thio) propionic acids and their derivatives hereinbefore defined, about 0.05 gram of each of the materials tested were mixed with one gram portions of lanolin. Some of the mixture was rubbed on petioles and some on the stems of young tomato plants. The treated plants were observed over a period of several days for nastic curvature and morphogenic changes. This is a well known method for the determination of the index of activity of plant stimulating substances. Such members of this new class of growth stimulants as beta-(2-thio-benzothiazyl) propionic acid, beta-(2-thio-4,5-dimethyl-thiazyl) propionic acid, beta-(2-thio-4-ethyl-thiazyl) propionic acid, beta-(2-thio-4,6,6-trimethyl thiazinyl) propionic acid, and beta-(2-thio-thiazolinyl) propionic acid all showed epinastic response in 72 hours.

The following examples illustrate the practical value of the stimulant activity of these beta-(heterocyclic-thio) propionic acids.

EXAMPLE II

Three inch terminal cuttings of chrysanthemum, variety Mary L. Hall, were immersed for 30 seconds in aqueous solutions containing members of the class of beta-(heterocyclic-thio) propionic acids. The treated portions of the cuttings were stuck in wet sterilized sand and inspected after 11 days for rooting. The aqueous solutions employed were prepared by dissolving a quantity of the growth stimulating compound sufficient to give the concentration desired, in an aqueous solution containing 0.025% by weight of sodium lauryl sulfate. The concentrations employed and the rooting initiation achieved is shown for a few members of this new class of growth regulants in Table II.

TABLE II

*Rooting initiation of chrysanthemum cuttings— variety Mary L. Hall*

| | Material | Concentration, mg./c. c. | Response after 11 days (percent rooted) |
|---|---|---|---|
| A | Beta-(2-thio-thiazolinyl) propionic acid | 0.125 | 70 |
| B | Beta-(2-thio-4,5-dimethyl thiazyl) propionic acid | 0.125 | 80 |
| C | Beta-(2-thio-4-ethyl thiazyl) propionic acid | 0.125 | 80 |
| D | Beta-(2-thio-4,6,6-trimethyl thiazinyl) propionic acid | 0.25 | 60 |
| E | Beta-(2-thio-4,6,6-trimethyl thiazinyl) propionic acid | 0.125 | 100 |
| F | Beta-(2-thio-benzothiazyl) propionic acid | 0.25 | 80 |
| G | Beta-(2-thio-benzothiazyl) propionic acid | 0.125 | 100 |

All the cuttings in the above bench rooting trials were uniformly calloused. When chrysanthemum cuttings are merely immersed in water and stuck in wet sterilized sand, only 50% root in four to six weeks.

EXAMPLE III

Four inch terminal cuttings of daisy were treated with the same compositions as employed in Example II and subjected to bench rooting trials in wet sterilized sand. The results of the bench rooting trials are shown in Table III where the compositions designated by letter are the same as those in Table II.

TABLE III

*Rooting initiation of daisy cuttings*

| Composition | Concentration, mg./c. c. | Response after 11 days (percent rooted) |
|---|---|---|
| A | 0.125 | 90 |
| B | 0.125 | 100 |
| C | 0.125 | 100 |
| D | 0.25 | 80 |
| E | 0.125 | 90 |
| F | 0.25 | 60 |
| G | 0.125 | 90 |

All the cuttings in the above bench rooting trials were uniformly calloused.

EXAMPLE IV

Three to four inch terminal cuttings of dogwood were treated with an aqueous solution containing 0.125 gram of beta-(2-thio-benzothiazyl) propionic acid per liter. All of the cuttings were uniformly calloused in about 45 days.

EXAMPLE V

Two to three inch terminal cuttings of mulberry were immersed in aqueous solutions of beta-(2-thio-benzothiazyl) propionic acid at concentrations of 0.25 gram per liter and 0.125 gram per liter. All of the cuttings were uniformly calloused in 45 days. 23% of the cuttings treated with the 0.25 g./l. solution rooted in about 60 days and 33% of the cuttings treated with the 0.125 g./l. solution rooted in the same time.

EXAMPLE VI

Terminal cuttings of Pachysandra two inches long, holly (*Ilex opaca*) two to three inches long and snapdragon three to four inches long, and tomato (Marglobe) petioles with leaves were treated with aqueous solutions of beta-(2-thio- 4,5-dimethyl-thiazyl) propionic acid and beta-(2-thio-4-ethyl-thiazyl) propionic acid at various concentrations, and were subjected to bench rooting trials. The results of the use of solutions at 0.25 gram per liter and 0.125 gram per liter of these beta-(2-thio-alkyl thiazyl) propionic acids is shown in Tables IV to VII below. These solutions also contained 0.025% by weight of a wetting agent, sodium lauryl sulfate, to insure good wetting of the cuttings with the solution containing the growth stimulant.

TABLE IV
Rooting initiation of Pachysandra cuttings

| Stimulant Used | Concentration, g./l. | Observation 23 days after treatment |
|---|---|---|
| Beta-2-thio-alkyl-thiazyl) propionic acids). | 0.25 | 25% rooted— all well calloused. |
| | 0.125 | 65% rooted—all well calloused. |

TABLE V
Rooting initiation of holly (Ilex opaca) cuttings

| Stimulant Used | Concentration, g./l. | Observation 27 days after treatment |
|---|---|---|
| Beta-(2-thio-alkyl-thiazyl) propionic acids. | 0.25 | Uniformly calloused. |
| | 0.125 | Do. |

TABLE VI
Rooting initiation of snapdragons—var. Margaret

| Stimulant Used | Concentration, g./l. | Observation after 20 days |
|---|---|---|
| Beta-(2-thio-alkyl-thiazyl) propionic acids. | 0.25 | 100% Heavily rooted. Some primordia. |
| | 0.125 | 60% Heavily rooted. |

All cuttings were uniformly calloused.

TABLE VII
Rooting initiation of snapdragons— var. Lady Dorothy

| Stimulant Used | Concentration, g./l. | Observation after 20 days |
|---|---|---|
| Beta-(2-thio-alkyl-thiazyl) propionic acids. | 0.25 | 55% Good rooting. |
| | 0.125 | 60% Good rooting. |

All cuttings were uniformly calloused.

TABLE VIII
Rooting initiation of tomato—var. Marglobe— petioles with leaves

| Stimulant Used | Concentration, g./l. | Observation after 20 days |
|---|---|---|
| Beta- (2-thio-alkyl-thiazyl) propionic acids. | 0.25 | 100% Heavily rooted. Many Primordia. |
| | 0.125 | Do. |

All specimens were uniformly calloused.

EXAMPLE VII

Four inch terminal cuttings of yew (Taxus) were immersed in aqueous solutions of beta-(heterocyclic-thio) propionic acids at various concentrations. These solutions contained 0.025% sodium lauryl sulfate, as a wetting agent to insure thorough wetting of the cuttings with the solution containing the growth stimulant. The treated cuttings were stuck in wet sterilized sand. The table below illustrates the rooting results obtained with the optimum concentration for these cuttings of three of the members of this new class of growth regulants.

TABLE IX
Rooting initiation of yew (Taxus) cuttings

| Stimulant Employed | Concentration, g./l. | Observation after 60 days |
|---|---|---|
| Beta-(2-thiothiazolinyl) propionic acid | 0.125 | 90% rooted. |
| Beta-(2-thio-4, 5-diethylthiazyl) propionic acid. | 0.125 | 100% rooted. |
| Beta-(2-thio-benzothiazyl) propionic acid. | 0.125 | 90% rooted. |

Indolebutyric acid at a concentration of 0.25 gram per liter produced no rooting.

When such derivatives of beta-(heterocyclic-thio) propionic acids as the ammonium and alkali metal salts, the amides and substituted amides, and the esters of these acids are employed as growth stimulants in the same manner as described in the above examples, the results obtained are similar. In general, the acids and their derivatives produce good uniform callousing on most all terminal cuttings at concentrations of from 0.1 to about 0.3 gram per liter. The concentrations of dusts or dispersions consisting of solid pulverulent inert material with these stimulants is, in general, somewhat higher because the dusts and solid pulverulent dispersions are not such a carrying medium which will supply uniform and efficient contact between the stimulant and the plant structure.

These beta-(heterocyclic-thio) propionic acids, salts, amides and esters have been successfully used to root apple cuttings especially the terminal cuttings and cuttings of growth which is up to two years old. The treated cuttings are uniformly calloused in about 40 to 45 days with some breaking buds in that time. In about 140 to 170 days numerous cuttings are rooting. Again the optimum concentrations for initiating rooting is in the range of 0.1 to 0.3 gram per liter.

An additional example of the utility of my compositions is illustrated by their ability to reduce the number of blossoms on fruit trees. The thinning is believed to be accomplished by the stimulation of the abscission cells of the blossom stems by the hormone-like activity of the beta-(heterocyclic-thio) propionic acids and their salts, amides and esters. The thinning of fruit blossoms is extremely desirous for fruit trees which normally have heavy fruit set either because of self-pollenization or otherwise, for, if the fruit set is heavy, the tree will bear only periodically, usually every other year. The years of heavy production is accompanied not only with a large quantity of small or undersized fruit but also with considerable limb damage because of the excess weight of the fruit. Orchard operators have attempted to overcome these problems of heavy setting of fruit by hand thinning of the set fruit which is not only slow but relatively expensive. Thus, the premature removal or drop of some of the blossoms by the application of a small amount of a material would be very useful. The following example illustrates the blossom thinning ability of these beta-(heterocyclic-thio) propionic acids and their derivatives. The results are typical for this class of compounds.

EXAMPLE VIII

Peach trees (variety—Hale Haven) were sprayed with aqueous solutions containing 20 parts by weight per million of the materials listed in Table X and apple trees (var. Blaxtayman) were sprayed with the compositions shown in Table XI. The solutions contained about 0.1% of a wetting agent to insure good wetting on contact. The sprays were applied at 90 pounds pressure at full bloom employing a pressure sprayer charged with carbon dioxide. To determine the effectiveness of the spray applications, the blossoms on the trees to be treated were counted. One-half of the blossoms on the trees were sprayed and the branches which held treated blossoms were tagged. The air temperature during spraying was 65° F. and rain fell about 3 hours after spraying thereby reducing the time of contact of the growth stimulants.

TABLE X

*Thinning of peach (var. Hale Haven) blossoms*

| Stimulant Employed | Number Blossoms | Set Fruit, Per Cent |
| --- | --- | --- |
| Beta-(2-thiobenzothiazyl) propionic acid | 573 | 32.4 |
| Beta-(2-thio-4,6,6-trimethylthiazinyl) propionic acid | 976 | 17.1 |
| Beta-(2-thio-4,5-dimethylthiazyl) propionic acid | 879 | 14.9 |

The percent set fruit is based on the total number of blossoms sprayed. The average set on unsprayed blossoms is in the range of 35 to 40%, and the desirable set as achieved by hand thinning is about 20 to 25%.

Table XI

*Thinning of apple (var. Blaxtayman) blossoms*

| Stimulant Employed | Concentration, P. P. M. | Number Fruit per 100 Blossom Spurs |
| --- | --- | --- |
| Beta-(2-thio-4,5-dimethylthiazyl) propionic acid | 10 | 41.4 |
|  | 20 | 35.0 |

The average number of set fruit per 100 blossom spurs for this variety of apple was 78.6. The desirable number of set fruit is in the range of 35 to 45 fruit per 100 blossom spurs for this heavy setting variety.

These growth stimulants have numerous other uses. For example, when seeds and tubers are treated with aqueous solutions and dispersions of such materials as beta-(2-thio-4,5-dimethylthiazyl) propionic acid, beta-(2-thio-4,5-dimethyl) propionamide, ethyl beta-(2-thio-4,5-dimethylthiazyl) propionate, beta-(2-thiobenzothiazyl) propionamide, zinc beta-(2-thiobenzothiazyl) propionic acid, beta-(2-thio-4,6,6-trimethylthiazinyl) propionamide, and the like in concentrations varying from as low as 0.1 gram per liter to about 1.0 gram per liter the root system of the resulting plants are much more prolific than those resulting from untreated seeds and tubers. A further example of the utility of these growth regulants is illustrated by the ability of these materials to stimulate root growth of plants after transplanting. For plants whose roots have been dipped into aqueous solutions or aqueous dispersions of these growth regulants or dusts prepared by incorporating the evocator with diatomaceous earths, talc, ordinary soils and the like and then planted in the usual manner, produce a more prolific root system in less time than untreated transplants. Consequently, the treated transplants are not set back in their growth to the same degree that untreated transplants are.

The use of these growth stimulants, in concentrations above about 20 grams per liter or in excess of about 2% by weight has, in general, sometimes produced severe injury to the plant structure. Accordingly, when these growth regulants are applied to plants by means of compositions containing these materials in concentrations of 5% or more by weight, the injury, in many instances, may be so severe as to cause the death of the plants treated which, of course, is desirable in some instances as in weed killing. Just how these materials cause the ultimate death of the plants is not completely understood, but it is believed that the presence of the greater amount of the growth regulants alters the metabolic processes of the plant so that the dominance of either anabolic or katabolic processes may lead to the death of the plant.

Although the major portion of the description of the utility of these beta-(heterocyclic-thio) propionic acids and their derivatives has been directed to the altering of the growth characteristics of portions of the plant structure in such a manner as to promote the propagation of plants, it is not intended that the invention shall be so limited, for, as stated above, the materials may well be employed to alter the physiology of the plant in such a manner as to kill the plants. In both cases the application of these growth regulants alters the growth characteristics of plants. Accordingly, the effect that these materials have on plants will be referred to in the appended claims as "altering the growth characteristics" of plants.

In the above examples, the concentration of the active ingredients in the compositions which were employed as growth stimulants was in the range of 0.001 to about 0.1% by weight. Although these concentrations are considered the optimum concentrations for the purposes for which they were used, the concentration of the active ingredient can be varied from about 0.001% to about 1% for growth stimulation without any deleterious effects. Thus, these growth stimulants have a wide range of tolerance in their application and can be safely employed without any special technical skill.

The effectiveness of the compounds of this invention will vary according to their individual characteristics, according to the type of plant structure treated and according to the purpose of the treatment. For example, a different concentration may be required for one variety of plants than required for another, and the concentration required for root initiation may be different from that required for root stimulation. Also, the concentration required for antidrop treatment of fruit, while in general is similar, may not be the same as that required to produce parthenogenesis. A further example of the varied activity of these compounds is illustrated by the effective concentration to cause the death of plants, for, in general, while concentrations of 2 to 5% of these materials are required to cause the ultimate death of plants, compositions containing only 0.5% by weight of beta-(2-thiobenzothiazyl) propionic acid will cause the ultimate death of such broad leaved plants as plantain, dandelion, burdock and others, in five to ten days, but blue grass is not damaged. Those skilled in the art having these factors in mind and noting the results of the above examples and the tendencies indicated therein, will be able to determine conditions most suitable in any given case. In any instance the concentration required to achieve the desired results will fall within the range of concentrations given above.

To those skilled in the art of the propagation of plants and especially those versed in the art of employing evocators of plant histogenesis and morphogenesis, many widely differing embodiments of the invention may become apparent. Accordingly, although I have disclosed specific examples of the utility of specific members of this new class of growth regulants, I do not thereby desire or intend to limit myself solely thereto, for as previously stated the vehicle and the amount of regulant employed may be varied and other materials of the class having equivalent physiological properties may be employed if desired without departing from the spirit and scope of the invention as defined in the appended claims.

I claim:

1. A method of altering the growth characteristics of plants which comprises wetting at least a portion of the plant structure with an aqueous composition containing a wetting agent and 0.001% to 5% by weight of a compound selected from the group consisting of beta-(heterocyclic-thio) propionic acids having the formula

A—S—CH₂CH₂COOH where A is a nitrogen containing heterocyclic radical having its connecting valence on a ring nitrogen atom and an atom selected from the group consisting of sulfur and oxygen and being otherwise composed of carbon and hydrogen atoms, and derivatives of said acids which can be converted to the free acids through hydrolysis involving one molecule of water.

2. A method of altering the growth characteristics of plants which comprises wetting at least a portion of the plant structure with an aqueous composition containing a wetting agent and 0.001% to 5% by weight of a beta-(2-thiothiazyl) propionic acid.

3. A method of altering the growth characteristics of plants which comprises wetting at least a portion of the plant structure with an aqueous composition containing a wetting agent and 0.001% to 5% by weight of a beta-(2-thio-thiazinyl) propionic acid.

4. A method of altering the growth characteristics of plants which comprises wetting at least a portion of the plant structure with an aqueous composition containing a wetting agent and 0.001% to 5% by weight of a beta-(2-thio-thiazolinyl) propionic acid.

5. A method of initiating root growth on plant cuttings which comprises wetting a portion of the cutting with an aqueous composition containing a wetting agent and 0.001% to 1% by weight of beta-(2-thio-benzothiazyl) propionic acid and then maintaining the cutting under conditions favoring root growth.

6. A method of initiating root growth on plant cuttings which comprises wetting a portion of the cutting with an aqueous composition containing a wetting agent and 0.001% to 1% by weight of beta-(2-thio-thiazolinyl) propionic acid and then maintaining the cutting under conditions favoring root growth.

7. A method of initiating root growth on plant cuttings which comprises wetting a portion of the cuting with an aqueous composition containing a wetting agent and 0.001% to 1% by weight of beta-(2-thio-4,6,6-trimethyl thiazinyl) propionic acid and then maintaining the cutting under conditions favoring root growth.

8. A method of initiating root growth on plant cuttings which comprises wetting a portion of the cutting with an aqueous composition containing a wetting agent and 0.001% to 1% by weight of beta-(2-thio-4,5-dimethyl-thiazyl) propionic acid and then maintaining the cutting under conditions favoring root growth.

9. A method of initiating root growth on plant cuttings which comprises wetting a portion of the cutting with an aqueous composition containing a wetting agent and 0.001% to 1% by weight of beta-(2-thio-4-ethyl-thiazyl) propionic acid and then maintaining the cutting under conditions favoring root growth.

10. A composition for altering the growth characteristics of plants which comprises an aqueous dispersion containing water, about 0.025% by weight of a dispersing or wetting agent and as an essential active ingredient 0.001% to 5% by weight of a compound selected from the group consisting of beta-(heterocyclic-thio) propionic acids having the formula A—S—CH₂CH₂COOH where A is a nitrogen containing heterocyclic radical having its connecting valence on a ring carbon atom directly intermediate to a ring nitrogen atom and an atom selected from the group consisting of oxygen and sulfur and being otherwise composed of carbon and hydrogen atoms, and derivatives of said acids which can be converted to the free acids through hydrolysis involving one molecule of water.

11. A composition for altering the growth characteristics of plants which comprises an aqueous dispersion containing water, about 0.025% by weight of a dispersing or wetting agent and, as an essential active ingredient, 0.001% to 5% by weight of a beta-(2-thiothiazyl) propionic acid.

12. A composition for altering the growth characteristics of plants which comprises an aqueous dispersion containing water, about 0.025% by weight of a dispersing or wetting agent and, as an essential active ingredient, 0.001% to 5% by weight of a beta-(2-thiothiazinyl) propionic acid.

13. A composition for altering the growth characteristics of plants which comprises an aqueous dispersion containing water, about 0.025% by weight of a dispersing or wetting agent and, as an essential active ingredient, 0.001% to 5% by weight of a beta-(2-thio-thiazolinyl) propionic acid.

14. A composition for altering the growth characteristics of plants which comprises an aqueous dispersion containing water, from 0.025% to 0.1% by weight of sodium lauryl sulfate and 0.001% to 1.0% by weight of beta-(2-thio-benzothiazyl) propionic acid.

15. A composition for altering the growth characteristics of plants which comprises an aqueous dispersion containing water, from 0.025% to 0.1% by weight of sodium lauryl sulfate and 0.001% to 1.0% by weight of beta-(2-thio-thiazolinyl) propionic acid.

16. A composition for altering the growth characteristics of plants which comprises an aqueous dispersion containing water, from 0.025% to 0.1% by weight of sodium lauryl sulfate and 0.001% to 1.0% by weight of beta-(2-thio-4,6,6-trimethyl thiazinyl) propionic acid.

17. A composition for altering the growth characteristics of plants which comprises an aqueous dispersion containing water, from 0.025% to 0.1% by weight of sodium lauryl sulfate agent and 0.001% to 1.0% by weight of beta-(2-thio-4,5-dimethyl-thiazyl) propionic acid.

18. A composition for altering the growth characteristics of plants which comprises an aqueous dispersion containing water, from 0.025% to 0.1% by weight of sodium lauryl sulfate agent and 0.001% to 1.0% by weight of beta-(2-thio-4-ethyl-thiazyl) propionic acid.

WILLIAM D. STEWART.

REFERENCES CITED

The following references are of record in the file of this patent:

UNITED STATES PATENTS

| Number | Name | Date |
|---|---|---|
| 1,961,840 | Bolton | June 5, 1934 |
| 1,962,109 | Alvord | June 5, 1934 |
| 2,326,471 | Lontz | Aug. 10, 1943 |
| 2,397,960 | Gribbins et al. | Apr. 9, 1946 |
| 2,416,052 | Gribbins et al. | Feb. 18, 1947 |
| 2,468,075 | Jayne et al. | Apr. 26, 1949 |

Certificate of Correction

Patent No. 2,535,876                                                  December 26, 1950

WILLIAM D. STEWART

It is hereby certified that error appears in the printed specification of the above numbered patent requiring correction as follows:

Column 7, Table IV, first column thereof, for that portion of the compound reading "Beta-2-thio" read *Beta-(2-thio*; column 8, line 32, for the word "material" read *materials*; column 9, lines 57 and 58, for "dimethyl)" read *dimethylthiazyl)*; column 11, line 33, after "ring" insert *carbon atom directly intermediate to a ring*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*